United States Patent [19]

Takahashi et al.

[11] Patent Number: 4,688,115
[45] Date of Patent: Aug. 18, 1987

[54] APPARATUS FOR REPRODUCING A DIGITAL SIGNAL

[75] Inventors: Toshihiko Takahashi, Chiba; Yoshizumi Inazawa; Toshiyuki Tani, both of Kanagawa; Shigeyuki Satomura, Tokyo, all of Japan

[73] Assignee: Sony Corporation, Tokyo, Japan

[21] Appl. No.: 842,251

[22] Filed: Mar. 21, 1986

[30] Foreign Application Priority Data

Apr. 5, 1985 [JP] Japan .................................. 60-72197

[51] Int. Cl.$^4$ .......................... G11B 5/52; G11B 15/14
[52] U.S. Cl. ........................................ 360/70; 360/64; 360/74.1
[58] Field of Search ..................... 360/8, 32, 74.1, 64, 360/72.2, 75, 70

[56] References Cited

U.S. PATENT DOCUMENTS 4,584,618 4/1986 Tassery .................................. 360/70
4,630,142 12/1986 Tani et al. ............................. 360/70

Primary Examiner—Vincent P. Canney
Attorney, Agent, or Firm—Lewis H. Eslinger; Alvin Sinderbrand

[57] ABSTRACT

An apparatus for reproducing digital signals recorded on a magnetic or other recording tape includes a servo mechanism which is effective, when the tape is transported at a high speed in either a fast-forward or rewind mode, to maintain a relative speed between the tape and a rotary head that is substantially the same as that in the normal playback mode. Moreover, in the rewind mode, the rotary head is rotated in the direction opposite to that in the normal playback mode, while the absolute value of the relative speed remains the same as that in the normal playback mode. Further, the digital signals reproduced by the rotary head in the rewind mode have their sequential order reversed.

8 Claims, 5 Drawing Figures

APPARATUS FOR REPRODUCING A DIGITAL SIGNAL

BACKGROUND OF THE INVENTION

1. Field of the Invention

This invention relates generally to apparatus for reproducing digital signals and, more particularly, is directed to improvements in apparatus of the rotary head type for reproducing digital signals recorded on magnetic or other recording tape.

2. Description of the Prior Art

Apparatus for recording and reproducing digital signals is known in which an audio or other analog signal is converted to digital signals which, along with digital signals indicating an address along the tape, a program number and the like, are recorded by a rotary head on a magnetic tape that is being transported at a normal tape speed. The digital signals thus recorded are reproduced from the tape transported at the normal speed by means of the rotary head scanning the tape, and the reproduced digital signals are converted to the corresponding audio or other analog signal, while the reproduced address, program number and the like are available for identifying the audio or other analog signal being reproduced. An example of apparatus for recording and reproducing digital signals is disclosed in detail in European Patent Application No. 0092403, filed by the assignee of the present application and published on Oct. 26, 1983.

In recording and reproducing apparatus of the described type, the tape is transported at a high speed, for example, in the fast-forward and fast-rewind modes of operation, when searching for a particular recorded program that is to be played back or reproduced. Even when the tape is thus transported at a high speed, it is desirable that the portion of the recorded digital signals indicating the address and program number be reproduced by the rotary head for use in indicating the position of the tape and for controlling the transport or drive of the latter. However, if the rotary head is rotated at the normal rotational speed when the tape is being transported at high speed, the relative speed between the rotary head and the transported tape will be different from the relative speed therebetween in the normal playback mode, and it becomes difficult to reproduce the digital signals recorded on the tape.

In U.S. patent application Ser. No. 06/791,518, filed by the present inventors on Oct. 25, 1985, and having an assignee in common herewith, there is disclosed an apparatus for reproducing digital signals recorded on a tape and in which, when the tape is transported at a high speed, the rotational speed of the rotary head is suitably controlled so that the relative speed between the rotary head and the tape remains substantially equal to that in the normal playback mode. In the foregoing apparatus, the rotary head is rotated in the same direction for the normal playback mode, the fast-forward mode and the fast-rewind mode. In order to make the relative speed between the rotary head and the tape in the rewind mode equal to such relative speed in the normal playback mode, it is necessary to substantially reduce the rotational speed of the rotary head as compared with its rotational speed for the normal playback mode. However, if the rotational speed of the rotary head is substantially decreased, the rotation of the motor driving the rotary head becomes unstable, and the output from a detecting device, such as, a frequency or pulse generator, for indicating the rotational phase of the rotary head, also becomes unstable. Accordingly, the absolute tape speed in the fast-rewind mode is limited in the above-described apparatus.

OBJECTS AND SUMMARY OF THE INVENTION

Accordingly, it is an object of this invention to provide an improved apparatus of the rotary head type for reproducing digital signals recorded on a tape, and which avoids the above-described difficulties encountered with previously proposed apparatus of that type.

More specifically, it is an object of this invention to provide an apparatus of the rotary head type for reproducing digital signals recorded on a tape, and which is effective to maintain a substantially constant relative speed between the rotary head and the tape for all operating modes of the apparatus, without unduly reducing the rotational speed of the rotary head for any of such operating modes.

Another object of this invention is to provide an apparatus, as aforesaid, having normal playback, fast-forward and fast-rewind modes, and in which the relative speed between the rotary head and the tape is substantially the same for the fast-forward mode and the fast-rewind mode as for the normal playback mode, while avoiding any need to unduly reduce the rotational speed of the rotary head in the fast-rewind mode so that the tape can be transported at a high speed in such fast-rewind mode.

In accordance with one aspect of the present invention, an apparatus for reproducing digital signals recorded on a recording tape comprises rotary head means in scanning relation to the recording tape for generating reproduced digital signals in response to the recorded digital signals on the tape, drive means for transporting the tape past the head means and for rotating the latter so that a relative speed is established between the head means and the tape, mode-selecting means for controlling the drive means so that the tape is selectively transported in forward and reverse directions at an absolute tape speed that can be varied in correspondence with selected operating modes of the apparatus, servo-means for adjusting the rotational speed with which the drive means rotates the head means in correspondence with variations of the absolute tape speed so that the relative speed between the head means and the tape is maintained at a substantially constant value for all of the operating modes of the apparatus, and control means for causing the drive means to normally effect rotation of the head means in a normal direction and to effect the rotating of the head means in a reverse direction during transporting of the tape at a high absolute speed in the reverse direction of tape transport, that is, in the fast-rewind mode of the apparatus.

In accordance with another feature of this invention, means are provided for reversing the sequence of the reproduced digital signals generated by the rotary head means in the fast-rewind mode of the apparatus.

The above, and other objects, features and advantages of the invention, will be apparent from the following detailed description of a preferred embodiment thereof when read in conjunction with the accompanying drawings in which the same references are used for identifying corresponding parts or components in the several views of the drawings.

DESCRIPTION OF A PREFERRED EMBODIMENT

Figure 1:
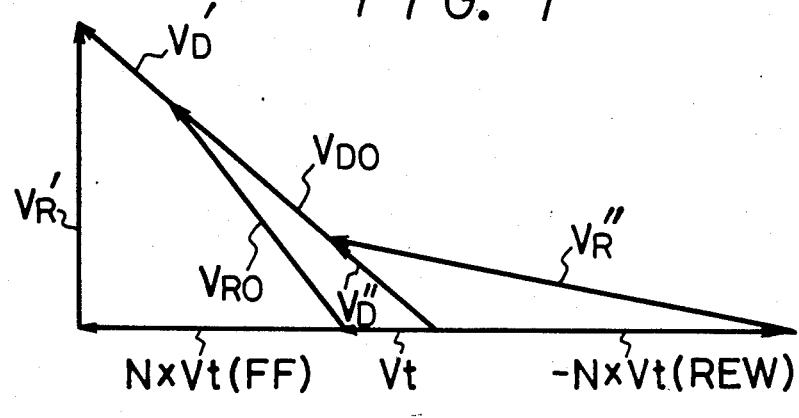
FIG. 1 is a vector diagram illustrating the relationship of tape transport speed, rotational speed of the rotary head and relative speed between the rotary head and tape for the normal playback mode, fast-forward mode and fast-rewind mode of an apparatus for reproducing digital signals as disclosed in our earlier mentioned U.S. patent application Ser. No. 06/791,518.

Referring to the drawings in detail, and initially to FIG. 1 thereof, it will be seen that the vector diagram there illustrated relates to an apparatus for reproducing digital signals recorded on a tape, and which is of a type having a substantially constant relative speed between the rotary head and the tape for a normal playback mode and also for a fast-forward mode in which the tape is transported in a forward direction and for a fast-rewind mode in which the tape is transported in a reverse direction, for example, as disclosed in detail in our earlier mentioned U.S. patent application Ser. No. 06/791,518 which we have been at all times since the invention thereof obliged to assign to the assignee of the present application. More particularly, in FIG. 1, $V_t$ designates the tape transport speed in the forward direction for the normal playback mode, $V_{DO}$ designates the rotational speed of the rotary head for the normal playback mode and $V_{RO}$ designates the relative speed between the rotary head and the tape for the normal playback mode. For the fast-forward mode (FF), the relatively high tape transport speed is indicated as $N \times V_t$, that is, the tape transport speed for the fast-forward mode is a multiple N of the tape transport speed $V_t$ for the normal playback mode. Further, for the fast-forward mode, the rotational speed of the rotary head and the relative speed between the rotary head and the tape for the fast-forward mode are indicated at $V_{D'}$ and $V_{R'}$, respectively. For the fast-rewind mode (REW), the tape transport speed is indicated at $-N \times V_t$ and is shown to be in the direction opposite to the tape transport for the fast-forward and normal playback modes, while the rotational speed of the rotary head and the relative speed between the rotary head and the tape are indicated at $V_{D''}$ and $V_{R''}$, respectively, for the fast-rewind mode.

It will be apparent from FIG. 1 that, in order for the relative speeds between the rotary head and the tape for the fast-rewind mode, the fast-forward mode and the normal playback mode to be substantially equal to each other, that is, $V_{RO} = V_{R'} = V_{R''}$, the rotational speeds of the rotary head for the fast-forward mode, the normal playback mode and the fast-rewind mode, respectively, must satisfy the following inequality $V_{D'} > V_{DO} > V_{D''}$.

Considering the fast-rewind mode, for example, as employed in a search operation, it will be appreciated that the rotational speed of the head must be less than that for the normal playback mode. As the tape transport speed is increased in the fast-rewind mode, that is, as the value of N is increased, the rotational speed of the rotary head, and hence of the associated tape guide drum, has to be correspondingly decreased for maintaining the constant relative speed between the rotary head and the tape until, theoretically, a point is reached at which the rotational speed of the head and drum is reduced to zero. Such reduction of the rotational speed of the rotary head and drum is disadvantageous, as follows:

If a frequency of pulse generator associated with the guide drum for detecting its rotational speed and phase is of the type employing a magnet for inducing a current in a coil as it passes the latter, the output from the frequency or pulse generator will be decreased in response to a substantial reduction in the rotational speed of the rotary head and drum so that reliable information as to the rotational speed and phase of the rotary head and drum may not be obtained.

Further, in the case of a recording and reproducing apparatus of the type in which the tape is wrapped around a portion of the peripheral surface of the guide drum enclosing a wrapping angle of 90°, there exists a period during each revolution of the guide drum when a rotary head is not in contact with the tape. Therefore, if the rotational speed of the rotary head and guide drum is reduced to zero, as described above, there is the danger that the guide drum may come to rest in a position where no head is in contact with the tape. Therefore, in that case, it is necessary to provide the drum with a device to stop the drum in a position where a head contacts the tape.

Furthermore, the affect of external disturbances on the operation of the recording and reproducing apparatus is much greater when the rotational speed of the head is low as compared with that encountered when the rotational speed is high.

Moreover, some motors used for driving the rotary head and associated guide drum have a minimum practical rotational speed with the result that the maximum tape transport speed, that is, the value of the multiple N, for the fast-rewind mode is limited in recognition of such practical minimum speed of the head drive motor.

Figure 3:
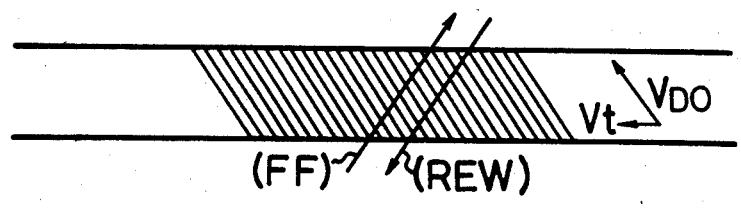
FIG. 3 is a diagrammatic view of a length of recording tape with skewed record tracks thereon, and illustrating the loci along which a rotary head of an apparatus according to the present invention scans the tape in various operating modes of the apparatus.

Generally, in accordance with the present invention, the foregoing problems are avoided by rotating the rotary head and associated guide drum in the fast-rewind mode in a direction that is reversed relative to the direction of rotation of the rotary head and guide drum in the normal playback mode and the fast-forward mode, as diagrammatically illustrated on FIG. 3. This is referred to as the "drum reverse rotation system".

Figure 2:
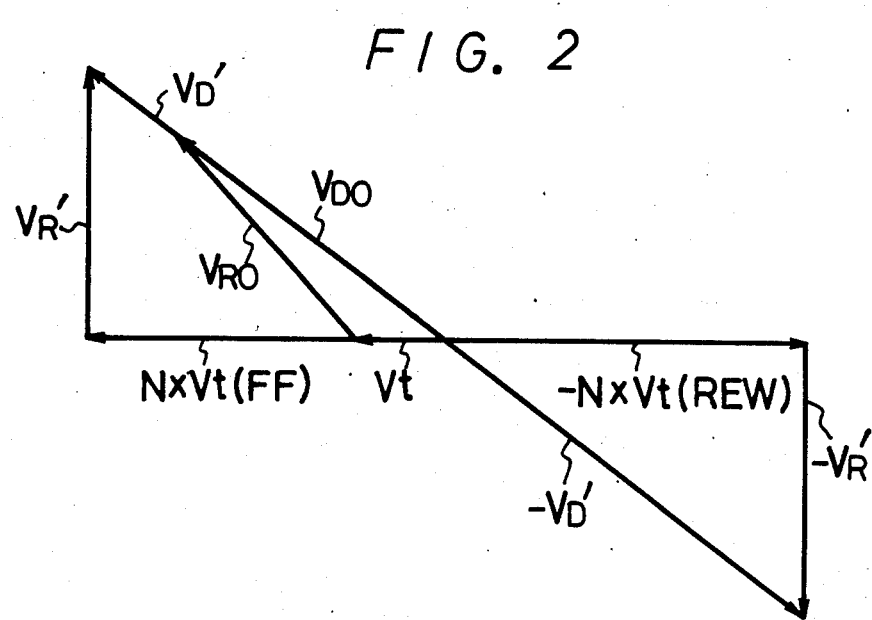
FIG. 2 is a vector diagram similar to that of FIG. 1, but to which reference will be made in explaining the present invention.

It will be apparent from FIG. 2 that, when the drum reverse rotation system according to the present invention is employed, the rotational speed $-V_{D'}$ of the rotary head and drum at which the relative speed $-V_{R'}$ for the fast-rewind search mode becomes equal to the relative speed $V_{RO}$ for the normal playback mode differs from the rotational speed $V_{D'}$ for the fast-forward mode only in respect to the direction of such rotation. In other words, the rotational speed $-V_{D'}$ has the same absolute value as the rotational speed $V_{D'}$. Therefore, in apparatus according to the present invention, the absolute value or magnitude of the rotational speed of the rotary head and associated drum in a search operation, that is, in the fast-forward mode and in the fast-rewind mode, is always larger than the absolute value or magnitude of the rotational speed of the rotary head and drum in the normal playback mode so long as the value of $N>1$.

Referring now to FIG. 3 in which the locus or trace of the rotary head relative to the tape is diagrammatically shown for the fast-forward search mode (FF) and for the rewind search mode (REW) of an apparatus according to this invention, that is, incorporating the drum reverse rotation system, it will be seen that signals reproduced in the rewind search mode are in a sequence that is the reverse of the sequence of such signals when reproduced in the fast-forward search mode. However, as will be described more fully hereinbelow, the reverse sequence of the signals reproduced in the rewind search mode can be dealt with by temporarily storing reproduced signals in a memory in the order in which the signals are reproduced from the tape, and then reading out the reproduced signals from the memory in the reverse order.

Figure 4:
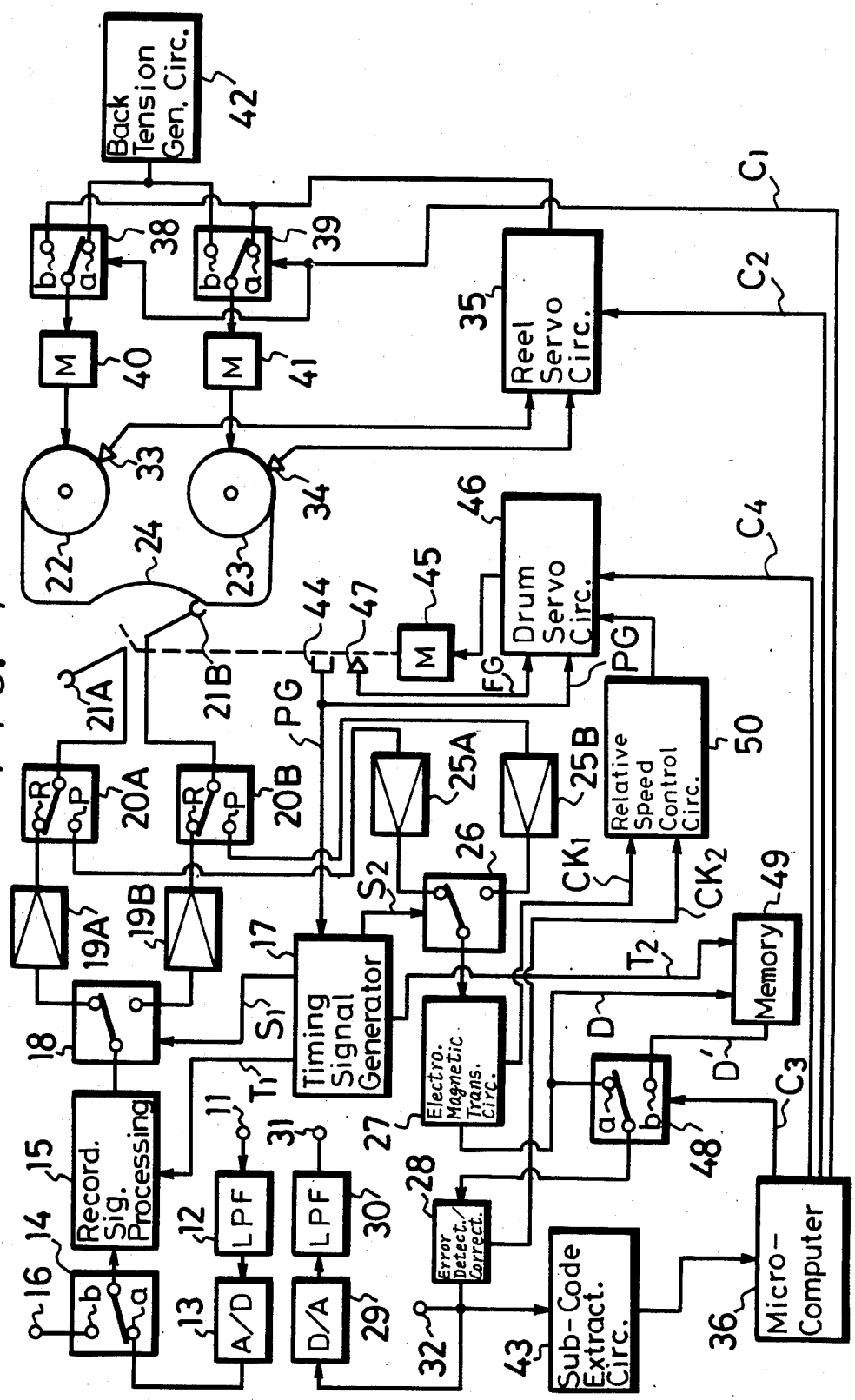
FIG. 4 is a block diagram illustrating an apparatus according to an embodiment of this invention for recording and reproducing digital signals.

Referring now to FIG. 4, it will be seen that, in a recording and reproducing apparatus according to an embodiment of this invention, an analog signal, for example, an audio signal applied to an input terminal 11, is supplied from the latter through a low pass filter (LPF) 12 to an analog-to-digital converter (A/D) 13 in which the analog signal is converted to digital signals. The digital signals from A/D converter 13 are applied to a contact a of a switching circuit 14 having its movable contact connected to a recording signal processing circuit 15. The movable contact of switching circuit 14 can be changed-over to engage a fixed contact b connected to a terminal 16 so that, in such condition of switching circuit 14, digital signals supplied to terminal 16 may be directly applied therefrom to the recording signal processing circuit 15.

Recording signal processing circuit 15 further receives a timing signal $T_I$ from a timing signal generating circuit 17 and, on the basis thereof, effects suitable processing of the data represented by the received digital signals, for example, the addition of an error correction code for the data, the interleaving of the data, the modulation of the data and so on. The resulting processed digital signals are supplied from circuit 15 to a head switching circuit 18 which is operated by a suitable switching signal $S_1$ from timing signal generating circuit 17. Head switching circuit 18 is shown to have two fixed contacts respectively connected through recording amplifiers 19A and 19B to record contacts R of record-playback switches 20A and 20B connected with rotary heads 21A and 21B, respectively. The rotary heads 21A and 21B are conventionally associated with a guide drum (not shown) so as to alternately scan across a magnetic tape 24 which extends between a supply reel 22 and a take-up reel 23, and is guided or wrapped about a portion, for example, a 90° angular extent, of the circumference of the guide drum. The head switching circuit 18 is disposed in the position shown on FIG. 4 for supplying the output of recording signal processing circuit 15 to rotary head 21A during a first half-revolution interval including the period in which head 21A is in contact with tape 24, and switching circuit 18 is changed-over by the switching signal $S_1$ from circuit 17 for supplying the output of recording signal processing circuit 15 to rotary head 21B during a second half-revolution interval which includes the period of contact of head 21B with tape 24.

In order to synchronize the changing over of switching circuit 18 with the rotational phase of rotary heads 21A and 21B, a pulse generator 44 is associated with a shaft through which a motor 45 drives rotary heads 21A and 21B, for example, at the rotational speed of 30 revolutions per second for the normal playback mode. The resulting pulse PG having a frequency of 30 Hz, in the case of the normal playback mode, and which is indicative of the rotary phase of heads 21A and 21B, is supplied from pulse generator 44 to timing signal generating circuit 17 for ensuring that the switching signal $S_I$ from circuit 17 to switching circuit 18 will cause change-over of the latter in synchronism with the rotary phase of heads 21A and 21B. The operation of head drive motor 45 is controlled by a drum servo circuit 46 which is supplied with the pulse PG from pulse generator so that motor 45 is servo-controlled in respect to phase on the basis of the pulse from generator 44. Drum servo circuit 46 also receives a signal FG from a frequency generator 47 associated with the shaft of motor 45 so that the latter is servo-controlled, in respect to speed or velocity changes, on the basis of the frequency signal FG from generator 47.

Switches 20A and 20B are maintained in the condition shown on FIG. 4 during a recording operation of the apparatus. When a reproducing or playback operation is desired, switches 20A and 20B are changed-over to engage their respective playback contacts P which are connected through respective playback amplifiers 25A and 25B to respective contacts of a head switching circuit 26. Head switching circuit 26 is operated similarly to head switching circuit 18 by a switching signal $S_2$ from timing signal generating circuit 17. Such switching signal $S_2$ from circuit 17 has a frequency of 30 Hz for the normal playback mode and is again synchronized with the rotational phase of heads 21A and 21B so that head switching circuit 26 transmits the output of playback amplifier 25A during the half-rotation interval which includes the period of tape contact of head 21A, and further so that switch 26 is changed-over to transmit the output of playback amplifier 25B during the other half-rotation interval that includes the tape contact period of head 21B.

The output of switching circuit 26 is supplied to a so-called electromagnetic transducer circuit 27 in which the reproduced digital signals are suitably processed, for example, by means of an equalizer, a comparator and a phase locked loop (PLL) circuit (not shown on FIG. 4) which are arranged in sequence, for example, as disclosed in detail in previously mentioned U.S. patent application Ser. No. 06/791,518. The processed digital signals from the output of circuit 27 are supplied to a contact a of a switching circuit 48 and also to a memory 49 which will be further described in detail. With switching circuit 48 in the condition shown on FIG. 4, the processed digital signals from circuit 27 are supplied through switching circuit 48 to an error detecting/correcting circuit 28 in which error correction is carried out, if necessary. The corrected digital signals are then supplied to a digital-to-analog (D/A) converter 29 to provide a corresponding analog signal supplied through a low pass filter 30 to an output terminal 31. The output of error detecting/correcting circuit 28 is also connected to a terminal 32 at which the digital data may be directly derived.

Rotation detectors 33 and 34 are provided to detect the rotational speeds of reels 22 and 23, respectively. The outputs of rotation detectors 33 and 34 are supplied to a reel servo circuit 35, and the output of reel servo circuit 35 is supplied to contacts b and a of switching circuits 38 and 39, respectively. The movable contacts of switching circuits 38 and 39 are connected to motors 40 and 41 for driving reels 22 and 23, respectively. A back tension generating circuit 42 provides a suitable output signal to contacts a and b of switching circuits 38 and 39, respectively. Switching circuits 38 and 39 are controlled by a control signal $C_1$ from a microcomputer 36 acting as a system controller. Thus, in the fast-forward search mode of the apparatus, switching circuits 38 and 39 engage their contacts a, as shown on FIG. 4, so that the output of reel servo circuit 35 is supplied through contact a of switching circuit 39 to motor 41 for servo-controlling the latter while driving take-up reel 23. Microcomputer 36 is further shown to supply a control signal $C_2$ to reel servo circuit 35 for determining the speed at which the selected motor 40 or 41 is driven, and hence the tape transport speed, in dependence on the selected mode of operation, for example, in response to actuation of a respective push-button or key providing an input to microcomputer 36.

Further, in the fast-forward search mode, the output of back tension generating circuit 42 is supplied through contact a of switching circuit 38 to motor 40 so that a suitable back tension is applied to supply reel 22 by motor 40.

When the normal playback mode is selected, control signal $C_1$ from micro-computer 36 causes switching circuits 38 and 39 to remain in the conditions shown on FIG. 4, but the control signal $C_2$ from microcomputer 36 to reel servo circuit 35 for determining the tape speed is changed so that reel servo circuit 35 causes operation of motor 41 at a speed consistent with the desired speed of tape transport for the normal playback mode.

Upon selection of the fast-rewind search mode, control signal $C_1$ from microcomputer 36 causes switching circuits 38 and 39 to change-over from the condition shown on FIG. 4 to the condition in which the fixed contacts b thereof are engaged. Thus, in the fast-rewind search mode, the output of reel servo circuit 35 is applied through switching circuit 38 to reel drive motor 40, while the output of back tension generating circuit is supplied through switching circuit 39 to reel drive motor 41. At the same time, the control signal $C_2$ for determining tape speed supplied from microcomputer 36 to reel servo circuit 35 ensures that motor 40 and supply reel 22 will be driven at a high speed consistent with the transport of the tape in the reverse direction at the speed $N \times V_t$.

The output of error detecting/correcting circuit 28 is shown to be further connected to a sub-code extracting circuit by which sub-code information, for example, program number, time code and the like, included in the reproduced digital signals is extracted from the latter and supplied to microcomputer 36. Accordingly, microcomputer 36 controls the high speed search operation by comparing the sub-code information received from circuit 43 with the corresponding program number, time code or the like identifying the data being searched.

The memory 49 may be of the first in, last out (FILO) type in which the data from one scan of the tape 24 by head 21A or 21B are written in the order in which the data are reproduced and, thereafter, the stored data are read out in the reverse order, as hereinafter described in greater detail. If desired, the memory 49 may be incorporated in error detecting/correcting circuit 28. In any case, the output of memory 49 is connected to a contact b of switching circuit 48 which is suitably controlled by a control signal $C_3$ from microcomputer 36 so that switching circuit 48 is changed-over to engage its contact b only in the fast-rewind search mode, whereas switching circuit 48 remains in the condition illustrated on FIG. 4, that is, with its contact a engaged, for all other operating modes of the apparatus. Accordingly, in any operating mode of the apparatus other than the fast-rewind search mode, the output from circuit 27 is transmitted directly through switching circuit 48 to error detecting/correcting circuit 28. However, in the fast-rewind search mode, switching circuit 48 is changed-over by the control signal $C_3$ from microcomputer 36 so as to engage its contact b with the result that the output from circuit 27 corresponding to a scan of the tape by head 21A or 21B is first stored in memory 49, and then read out therefrom in the reverse direction for transmission through contact b of switching circuit 48 to error detecting/correcting circuit 28.

Timing signal generating circuit 17 provides to memory 49 a pulse $T_2$ having a frequency twice as high as that of the head switching signals or pulses $S_1$ and $S_2$ which are supplied from timing signal generating circuit 17 to head switching circuits 18 and 26. In response to such relatively high frequency pulse $T_2$ from timing signal generating circuit 17, memory 49 is made operative, for example, during the high level portion of a pulse $T_2$ in which head 21A is in contact with tape 24, to write in memory 49 the output from circuit 27 whereas, during the low level period of the pulse $T_2$ in which head 21A is out of contact with tape 24, the data previously written in memory 49 is read out therefrom in the reverse direction. Similarly, during the high level period of the next pulse $T_2$ from circuit 17 in which head 21B is in contact with tape 24, the output from circuit 27 is written in memory 49 and, during the low-level period of that next pulse $T_2$ in which head 21B is out of contact with tape 24, the data previously written in memory 49 is read out therefrom in the reverse direction.

A clock signal $CK_1$ derived from the PLL circuit 53 included in electromagnetic transducer circuit 27 (FIG. 5) is shown on FIG. 4 to be supplied to a relative speed control circuit 50, and the output from the latter is supplied to drum servo circuit 46. The affect of the output of the relative speed control circuit 50 on the operation of drum servo circuit 46 is to ensure that the rotational speed of heads 21A and 21B and the associated drum is varied or controlled so as to ensure that the relative speed between each rotary head and the tape is at all times, for example, in the fast-forward search mode and the fast-rewind search mode, substantially the same as the relative speed in the normal playback mode. An example of the relative speed control circuit 50 is described in detail in U.S. patent application Ser. No. 06/791,518.

Drum servo circuit 46 is further shown to be controlled by a control signal $C_4$ from microcomputer 36 so that, at the same time that switching circuit 48 is changed-over to engage its contact b for the fast-rewind search mode, the corresponding control signal $C_4$ from microcomputer 36 to drum servo circuit 46 causes motor 45 to rotate heads 21A and 21B in the direction opposite to the direction of rotation of the rotary heads for the normal playback mode and the fast-forward mode. Simultaneously, reel servo circuit 35 receives control signal $C_2$ from microcomputer 36 for ensuring that tape 24 will be driven in the reverse direction at the requisite high speed ($N \times V_t$) of tape transport for the fast-rewind search mode.

In the fast-rewind search mode of the apparatus embodying this invention, as described above, since the direction of rotation of motor 45, and hence of the rotary heads and associated drum, is reversed as compared with the direction of rotation thereof for the normal playback mode and the fast-forward search mode, the relative speed between the rotary heads and the tape can be controlled so as to be substantially equal to the relative speed for the normal playback mode without requiring that the rotational speed of the rotary heads and associated drum be made lower than the rotational speed thereof in the normal playback mode. Thus, the previously described disadvantages of a very low rotational speed of the heads and drum are avoided.

Figure 5:
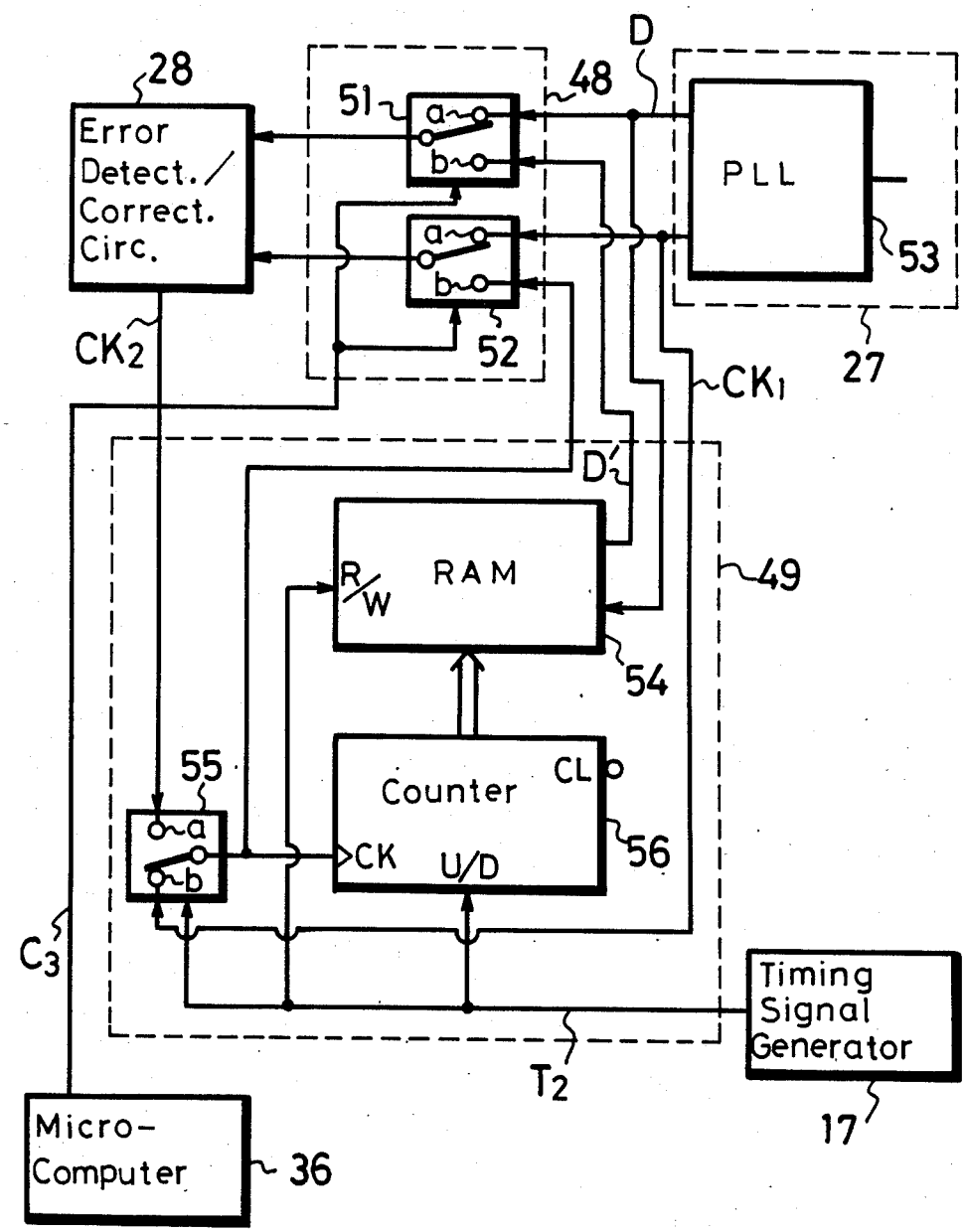
FIG. 5 is a block diagram showing a portion of the apparatus of FIG. 4 in greater detail.

Referring now to FIG. 5 in which a practical arrangement of memory 49 and the associated components of the apparatus are shown in greater detail, it will be seen that switching circuit 48 includes switches 51 and 52 controlled by signal $C_3$ from microcomputer 36 so as to simultaneously engage their contacts a or b. Contacts a of switches 51 and 52 are shown to be connected to the PLL circuit 53 of electro-magnetic transducer 27 for respectively receiving therefrom data D and the clock signal $CK_1$ derived from the reproduced digital signals. Thus, in the fast-forward search mode for which switches 51 and 52 are made to engage their contacts a, the data D and clock signal $CK_1$ are transmitted from circuit 27 through switches 51 and 52 to error detecting/correcting circuit 28.

For the fast-rewind search mode, switches 51 and 52 are changed-over, in response to control signal from $C_3$ microcomputer 36, so as to engage their contact b, whereby the data D from circuit 27 are supplied to a data input terminal of a random access memory (RAM) 54 provided in memory 49, while the clock signal $CK_1$ from circuit 27 is supplied to a contact b of a switching circuit 55. The output of switching circuit 55 is shown to be connected to a clock input CK of an up/down counter 56, and also to the contact b of switch 52, while the output of RAM 54 is connected to the contact b of switch 51. The changing-over of switching circuit 55, the change-over between the up and down operation of up/down counter 56, and the change-over between the writing and reading operation of RAM 54 while being addressed by the output of counter 56 are all controlled by the switching signal $T_2$ generated by timing signal generating circuit 17. Such switching signal $T_2$, as previously mentioned, has a frequency two times the frequency of the switching signals $S_1$ and $S_2$ controlling the head switching circuits 18 and 26. Thus, the switching signal $T_2$ applied from circuit 17 to RAM 54, switching circuit 55 and counter 56 in FIG. 5 may, for example, have a high level during each period in which the head 21A or 21B is in contact with the tape, while a low level of signal $T_2$ occurs during each period in which each head is out of contact with the tape.

By reason of the foregoing characteristics of switching signal $T_2$, during the period in which a head 21A or 21B is in contact with tape 24, switching circuit 55 is made to engage its contact b so that the reproduced clock signal $CK_1$ is supplied to the clock input CK of up/down counter 56 which is made by signal $T_2$ to count the reproduced clock signal $CK_1$ in the up direction. The upwardly changing content or output of counter 56 is applied to RAM 54 for sequentially addressing the latter and, at the same time, signal $T_2$ applied as a read/write control signal to RAM 54 causes writing of the data from PLL 53 at the successive addresses in RAM 54. In other words, the reproduced data D obtained from circuit 27 are written in RAM 54 at sequential addresses determined by the increasing output or content of counter 56. During the subsequent period in which the head 21A or 21B is out of contact with tape 24, signal $T_2$ causes switching circuit 55 to be changed-over and thereby engage its contact a, with the result that a clock signal $CK_2$ of constant frequency is supplied from error detecting/correcting circuit 28 through switching circuit 55 to the clock input CK of counter 56, and to the b contact of switch 52. Further, during the period in which the head 21A or 21B is not in contact with the tape, signal $T_2$ causes counter 56 to count the constant frequency clock signal $CK_2$ in the down direction, and also causes reading out of RAM 54. However, during such reading out of RAM 54, the content at the output of counter 56 is decreasing incrementally due to the down-counting operation of the counter, with the result that the addressing sequenc of RAM 54 is reversed from that for writing and the data D' read out of RAM 54 is reversed in its sequence relative to the reproduced data D previously written therein.

As earlier noted, in the fast-rewind search mode, switches 51 and 52 are made to engage their contact b so that, during the above described read out of data D' from RAM 54, such data D' in the reverse order or sequence is supplied through switch 51 to error detecting/correcting circuit 28, while the clock signal $CK_2$ is supplied through switch 52 to circuit 28.

Since the order in which recorded signals are reproduced from the tape in the fast-rewind search mode of the apparatus embodying this invention is the reverse of the normal order due to the rotation of heads 21A and 21B in the reverse direction, as shown on FIG. 3, the described further reversing of the order of the data D' read out of RAM 54 ensures that such data D' will appear in the same sequential order in which it was originally recorded. Thus, sub-code information obtained from extracting circuit 43 (FIG. 4) in the fast-rewind search mode can still be employed in micro-computer 36 for controlling the search operation even though such sub-code information was obtained from data reproduced during rotation of heads 21A and 21B in the reverse direction.

In the apparatus according to this invention, the rotational speed of heads 21A and 21B at which the relative speed between the heads and the tape in the fast-rewind search mode becomes equal to the magnitude of the relative speed in the normal playback mode can be determined while rotating the drum and rotary heads in the reverse direction, that is, opposite to the direction in which the tape is transported in the normal playback mode and the fast-forward search mode. Thus, without making the absolute value of the rotational speed of the drum and rotary heads for the fast-forward and fast-rewind search modes less than the absolute value of such rotational speed for the normal playback mode, the relative speed between the heads and tape for each high speed tape transport playback mode (fast-forward and fast-rewind search modes) can be controlled so as to be equal to the relative speed for the normal playback mode. In other words, the rotational speed of the drum and rotary heads in the search mode can be maintained at least as high as the rotational speed as the drum and rotary heads in the normal playback mode, thereby avoiding the disadvantageous external disturbance and instability of the pulses PG and FG from generators 44 and 47 and of the servo circuit 46 that result when the rotational speed of motor 45 has to be decreased to nearly zero for the fast-rewind search mode. Since there is no need to reduce the rotational speed of motor 45, and hence of rotary heads 21A and 21B and the associated drum to approximately zero, it is also unnecessary to provide any additional device for disposing the heads in a predetermined position at such time. Moreover, there is no need to employ, as the motor 45, a motor that can be rotated at a slow speed, for example, lower than 100 rpm. Rather, the motor 45 only needs to be a reversible motor.

Although a preferred embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. Apparatus for reproducing digital signals recorded on a recording tape, comprising:
    rotary head means in scanning relation to the recording tape for generating reproduced digital signals in response to said digital signals recorded on the tape;
    drive means for transporting said tape past said head means and for rotating said head means so that a relative speed is established between said head means and said tape;
    mode-selecting means for controlling said drive means so that the tape is selectively transported in first and second directions at an absolute tape speed that can be varied in correspondence with selected operating modes of the apparatus;
    servo-means for adjusting the rotational speed with which said drive means rotates the head means in correspondence with variations of said absolute tape speed so that said relative speed is maintained at a substantially constant value for all of said operating modes of the apparatus; and
    control means for causing said drive means to normally effect said rotating of the head means in a normal direction and to effect said rotating of the head means in a reverse direction during transporting of said tape at a high absolute speed in one of said first and second directions.

2. Apparatus according to claim 1; in which said control means causes said rotating of said head means in said reverse direction upon the selection of a fast-rewind mode of the apparatus.

3. Apparatus according to claim 2; further comprising means for reversing the sequence of said reproduced digital signals generated by said rotary head means in said fast-rewind mode of the apparatus.

4. Apparatus according to claim 1; in which said mode-selecting means controls said drive means so that said absolute tape speed and direction are selectively established to be appropriate to a playback mode, a fast-forward mode, and a fast-rewind mode, the absolute tape speed in said fast-forward and rewind modes is a substantial multiple of the absolute tape speed in said playback mode, said substantially constant value of said relative speed is appropriate to said playback mode, and said rotating of the head means in said reverse direction occurs upon selection of said fast-rewind mode.

5. Apparatus according to claim 1; further comprising means for reversing the sequence of said reproduced digital signals generated by said rotary head means when said head means is rotated in said reverse direction and said tape is transported at a high speed in said one direction.

6. Apparatus according to claim 5; in which said rotary head means scans the recording tape only during a portion of each revolution of the head means; and said means for reversing the sequence of said reproduced digital signal includes memory means having a capacity to store the reproduced digital signals generated by said head means during each scan of the recorded tape, means for addressing said memory means in a predetermined order for writing of said reproduced digital signals therein during said portion of each revolution of said head means, and means for reversing said predetermined order in which said memory means is addressed for reading out of said reproduced digital signals therefrom during the remainder of said revolution of the head means.

7. Apparatus according to claim 6; in which said means for addressing said memory means includes up/down counting means having a clock input and an addressing output which changes in said predetermined order during counting of the clock input in an up direction, and said means for reversing the predetermined order includes timing means connected with said memory means and said counting means and causing said counting means to count in up and down directions during writing and reading, respectively, of said memory means.

8. Apparatus according to claim 7; in which said recorded digital signals include recorded data signals and clock signals; and further comprising means for applying the clock signals, as reproduced by said head means, to said clock input of the counting means during said writing in the memory means, and means for applying clock signals of standard frequency to said clock input during said reading from the memory means.

* * * * *